United States Patent [19]

Siekierski

[11] Patent Number: 6,036,379
[45] Date of Patent: *Mar. 14, 2000

[54] CAMERA WITH HAND-PRESSURE ACTIVATED ILLUMINATOR

[75] Inventor: Roger A. Siekierski, Webster, N.Y.

[73] Assignee: Eastman Kodak Company, Rochester, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 09/110,637

[22] Filed: Jul. 6, 1998

[51] Int. Cl.[7] ................................................. G03B 17/38
[52] U.S. Cl. ........................... 396/502; 396/287; 396/543
[58] Field of Search ................................... 396/263–267, 396/281, 282, 287, 502, 503, 504, 543

[56] References Cited

U.S. PATENT DOCUMENTS

| | | |
|---|---|---|
| 3,596,580 | 8/1971 | Rentschler .......................... 396/287 X |
| 4,529,291 | 7/1985 | Mizogui . |
| 5,072,248 | 12/1991 | Kakiuchi . |

*Primary Examiner*—Howard B. Blankenship
*Attorney, Agent, or Firm*—Roger A. Fields

[57] ABSTRACT

A camera comprising a manually actuatable operating button, an activatable light source located at the operating button to illuminate the operating button when the light source is activated, and a hand-pressure-responsive switch connected to the light source to be closed to activate the light source when one holds the camera, whereby the operating button can be seen in a darkened surrounding.

4 Claims, 2 Drawing Sheets

CAMERA WITH HAND-PRESSURE ACTIVATED ILLUMINATOR

FIELD OF THE INVENTION

The invention relates generally to the field of photography, and in particular to cameras. More specifically, the invention relates to a camera with a hand-pressure activated illuminator for illuminating a manually actuatable operating button such as a shutter release button.

BACKGROUND OF THE INVENTION

Cameras, today, may have a number of manually actuable operating buttons such as a shutter release button, an exposure mode or focus zone selection button, etc. When the camera is used in a somewhat darkened surrounding, it may be difficult to see the operating button. This can result in a lost picture-taking opportunity.

SUMMARY OF THE INVENTION

A camera comprising:
a manually actuatable operating button;
an activatable light source located at the operating button to illuminate the operating button when the light source is activated; and
a hand-pressure-responsive switch connected to the light source to be closed to activate the light source when one holds the camera, whereby the operating button can be seen in a darkened surrounding.

DETAILED DESCRIPTION OF THE INVENTION

The invention is disclosed as being embodied preferably in a camera. Because the features of a camera are generally known, the description which follows is directed in particular only to those elements forming part of or cooperating directly with the disclosed embodiment. It is to be understood, however, that other elements may take various forms known to a person of ordinary skill in the art.

Figure 1:
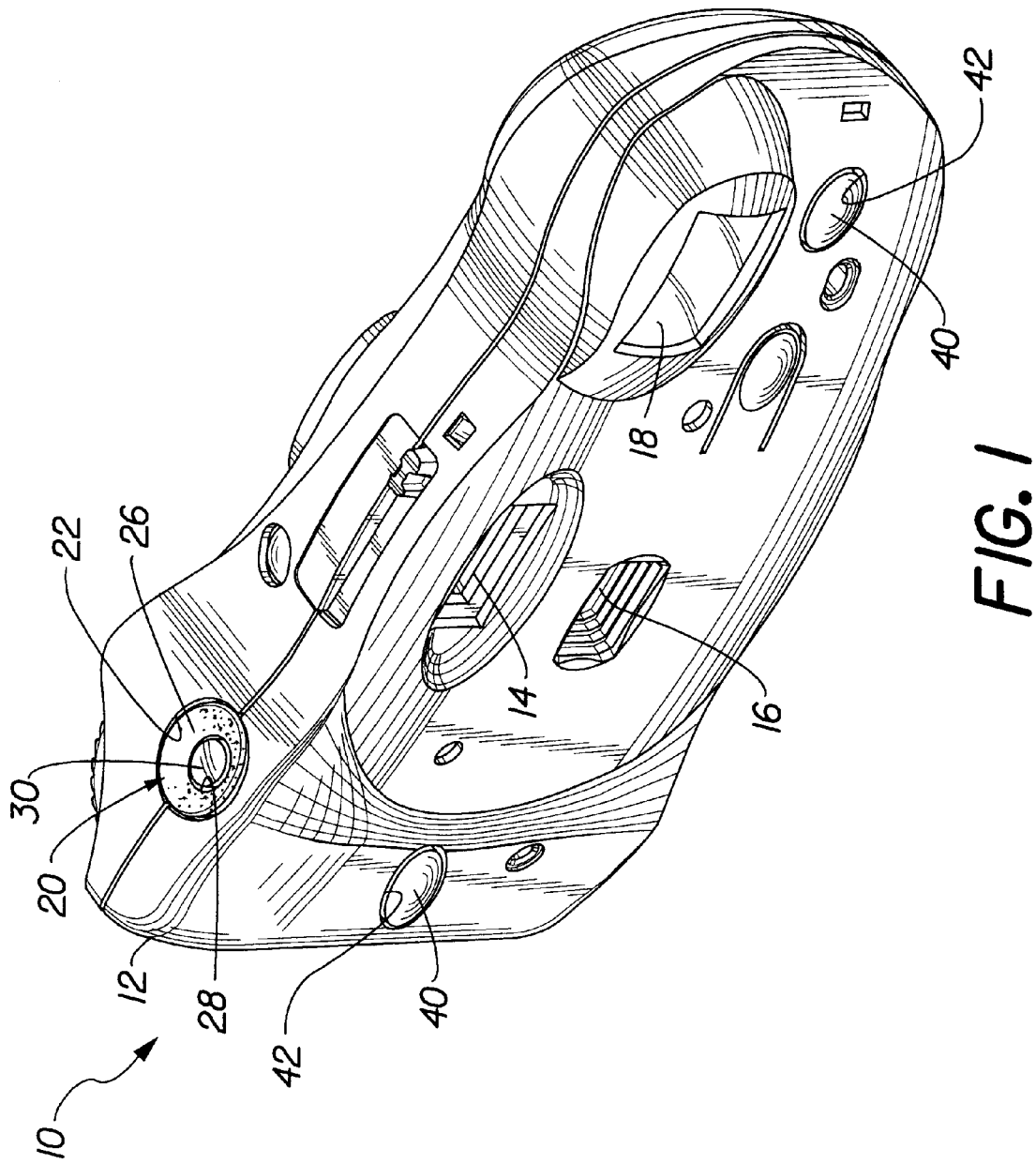
FIG. 1 is a front perspective view of a camera according to a preferred embodiment of the invention.
Figure 2:
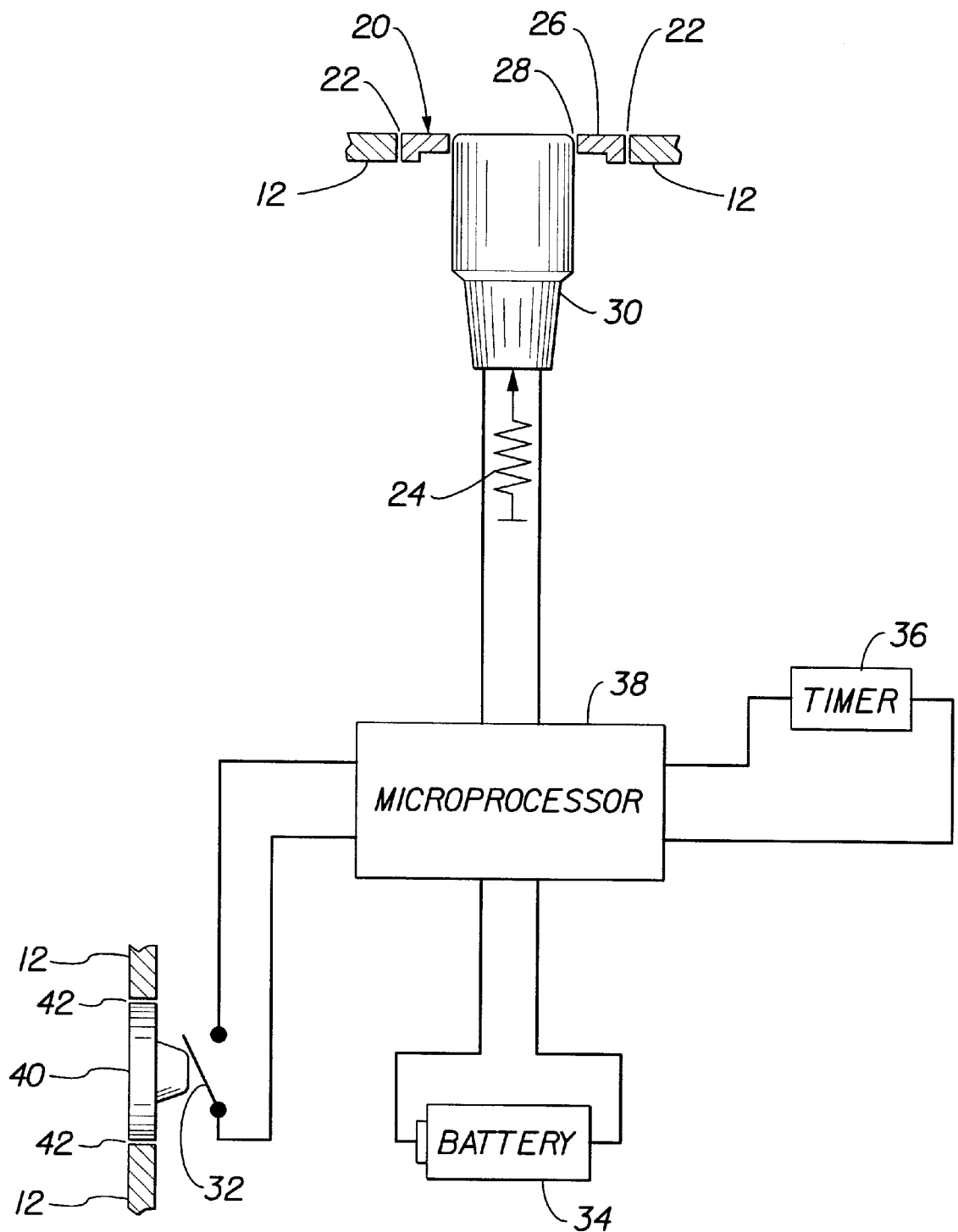
FIG. 2 is a schematic view of a manually depressible shutter release button and a hand-pressure-responsive switch connected to a light source located at the shutter release button, in the camera.

Referring now to the drawings, FIGS. 1 and 2 show a camera 10 including a plastic housing 12, a viewfinder 14, a taking lens 16 and an electronic flash 18.

A shutter release button 20 is manually depressible within a top opening 22 in the housing 12, in opposition to the continuous urging of a return spring 24, to initiate picture-taking. A topmost pressing portion 26 of the shutter release button 20 has a top opening 28. A known light source 30 is embedded in the shutter release button, as shown in FIGS. 1 and 2, to be visible at the top opening 28. Thus, when the light source 30 is activated, i.e. is turned on, it illuminates the shutter release button 20. This is useful to permit the shutter release button 20 to be readily seen in a darkened surrounding.

Two identical, biased-open, pressure-responsive switches 32 (only one shown in FIG. 2), a battery 34, a known timer 36 and the light source 30 are individually connected to a known microprocessor 38. The microprocessor controls operation of the camera 10. Respective protuberances 40 are manually depressible at front openings 42 in the housing 12. The protuberances 40 are located over the separate switches 32 as depicted in FIG. 2. Whenever one holds or grips the housing 12 to take a picture, his or her hands are positioned on at least one of the protuberances 40. Consequently, at least one of the protuberances 40 is automatically depressed to close at least one of the switches 32 and, in turn, activate the light source 30. At the same time, the timer 36 is set to a particular time, for example sixty seconds, but does not begin its count-down from the set time. If one releases the protuberances 40, the switches 32 spring open, which then initiates the count-down. Both of the switches must be open for the countdown to begin.

A method of operating the camera 10 comprises the steps:
prior to manually depressing the shutter release button 20 to initiate picture-taking, closing at least one of the hand-pressure-responsive switches 32 by manually depressing at least one of the protuberances 40, to activate the light source 30 in order to illuminate the shutter release button; and
manually depressing the shutter release button 20 to initiate picture-taking when the light source 30 is activated.

The invention has been described with reference to a preferred embodiment. However, it will be appreciated that variations and modifications can be effected by a person of ordinary skill in the art without departing from the scope of the invention. For example, the protuberances 40 can be integrally formed with the housing 12, but be flexible to permit them to be manually depressed. Also, the shutter release button 20 and the light source 30 can be the same element rather than being two different elements.

Parts List 10. camera
12. housing
14. viewfinder
16. taking lens
18. electronic flash
20. shutter release button
22. top opening
24. return spring
26. topmost pressing portion
28. top opening
30. light source
32. pressure-responsive switches
34. battery
36. timer
38. microprocessor
40. protuberances
42. front openings

What is claimed is:

1. A camera comprising:
only one manually actuatable shutter release button which is manually actuatable to initiate picture-taking;
an activatable light source located at said shutter release button to illuminate the shutter release button when said light source is activated; and
a hand-pressure-responsive switch connected to said light source and positioned to be closed in response to hand pressure when one holds said camera in the vicinity of said switch, spaced from said shutter release button to be closed when hand pressure is out of contact with said shutter release button, and when closed activates the light source without having to actuate said shutter release button, whereby said shutter release button can be seen in a darkened surrounding in order to actuate the shutter release button to initiate picture-taking.

2. A camera as recited in claim 1, wherein a manually depressible element separate from said shutter release button that is actuatable to initiate picture-taking is located over said switch to be manually depressed to close said switch and is spaced from the shutter release button to not actuate the shutter release button when said manually depressible element is manually depressed.

3. A camera as recited in claim 1, wherein a number of hand-pressure-responsive switches are connected to said light source to be individually closed to activate the light source, and respective manually depressible elements are located over said switches to be individually manually depressed to separately activate said light source.

4. A method of operating a camera comprising the steps:
prior to initiating picture-taking, closing a hand-pressure-responsive switch connected to a light source at a shutter release button, to activate the light source in order to illuminate the shutter release button; and
depressing the shutter release button to initiate picture-taking when the light source is activated.

* * * * *